United States Patent
Demmer

(10) Patent No.: US 8,757,822 B2
(45) Date of Patent: Jun. 24, 2014

(54) ASTIGMATISM COMPENSATION IN SPECTROMETERS USING NON-SPHERICAL MIRRORS

(75) Inventor: David R. Demmer, Toronto (CA)

(73) Assignee: Ocean Optics, Inc., Dunedin, FL (US)

( * ) Notice: Subject to any disclaimer, the term of this patent is extended or adjusted under 35 U.S.C. 154(b) by 192 days.

(21) Appl. No.: 13/347,862

(22) Filed: Jan. 11, 2012

(65) Prior Publication Data

US 2012/0188661 A1     Jul. 26, 2012

Related U.S. Application Data

(60) Provisional application No. 61/435,913, filed on Jan. 25, 2011.

(51) Int. Cl.
  *G02B 5/08*   (2006.01)
  *G02B 27/00*  (2006.01)
  *G01J 3/02*   (2006.01)

(52) U.S. Cl.
  CPC ........... *G02B 27/0037* (2013.01); *G01J 3/0208* (2013.01); *Y10S 359/90* (2013.01)

USPC .......................................... 359/846; 359/900

(58) Field of Classification Search
  None
  See application file for complete search history.

(56) References Cited

U.S. PATENT DOCUMENTS 7,518,722 B2 *  4/2009  Julian et al. .................... 356/328
7,697,137 B2 *  4/2010  Comstock, II ................ 356/328

* cited by examiner

*Primary Examiner* — Jade R Chwasz
(74) *Attorney, Agent, or Firm* — Dennis L. Cook, Esq.

(57) ABSTRACT

A method of making specially shaped mirrors for astigmatism correction in spectrometers having a folded optical path using two mirrors by determining the curvature of one or both mirrors in the vertical direction such that the focal length in the sagittal direction of each of said one or both mirrors becomes the same as the focal length in the tangential direction wherein the radius of curvature of each of one or both mirror in the sagittal plane is adjusted to be equal to the radius of curvature in the tangential plane of each of one or both mirrors times the square of the cosign of the angle of incidence of the optical path at each of one or both mirrors is described.

2 Claims, 3 Drawing Sheets

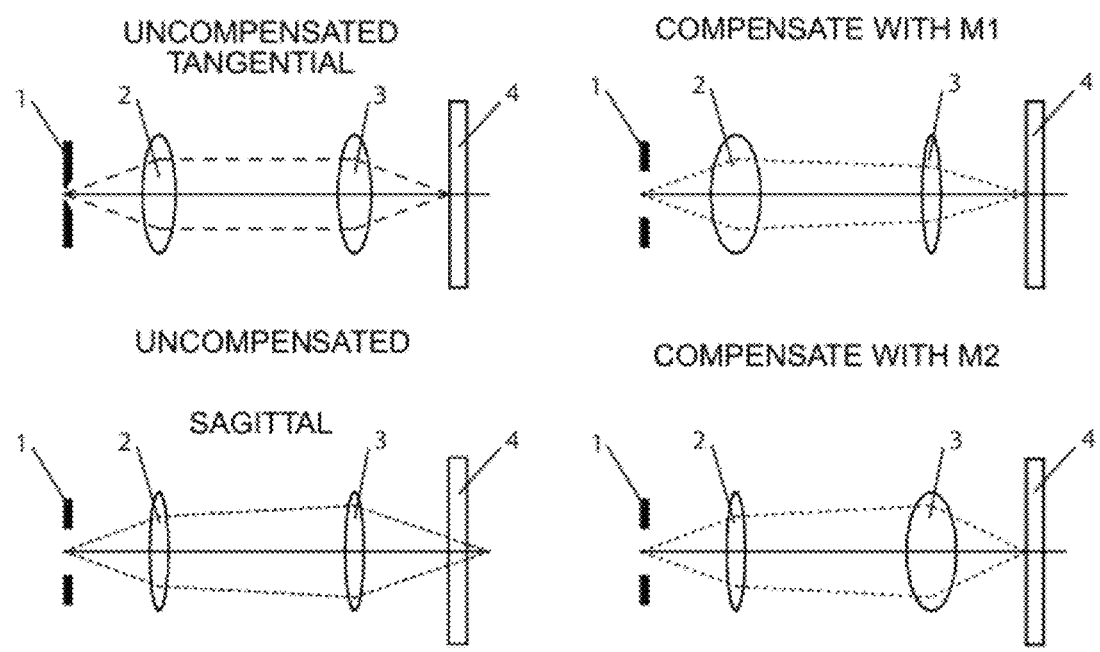

US 8,757,822 B2

ASTIGMATISM COMPENSATION IN SPECTROMETERS USING NON-SPHERICAL MIRRORS

CROSS-REFERENCE TO RELATED APPLICATION

The present application claims the benefit of previously filed Provisional Patent Application, Ser. No. 61/435,913 filed on Jan. 25, 2011.

FIELD OF THE INVENTION

This invention belongs to the field of manufacture of spectrometers. More specifically it employs one or more specially configured mirrors to correct astigmatism in spectrometers.

BACKGROUND OF THE INVENTION

The optical system of a spectrometer projects the image of an illuminated slit onto a plane containing a detector. The formation of the image is governed by the usual issues of magnification and vignetting found in any optical system. Optimum resolution results from forming an aberration-free image at the detector plane.

Optimal use of a dispersive element, such as a diffraction grating or prism, requires that it be placed in a collimated portion of the optical system. This leads to a simplification in the analysis of the spectrometer optics, since the overall magnification is then determined by the ratio of the focal lengths of the focusing and collimating optics: M=F2/F1.

When the dispersive element is a reflective diffraction grating the optical path shown in FIG. 1 must be folded. To avoid chromatic aberration it is desirable to use reflective optics rather than lenses. The result is an optical train that contains at least three folds. A common arrangement for such a system is shown in FIG. 2, which depicts a symmetrical Czerny-Turner design.

The disadvantage of this system is that using spherical mirrors in a folded configuration introduces astigmatism, in which the effective focal length of the mirror in the plane of the fold (the tangential plane) is different from that in the perpendicular (or sagittal) plane. The on-axis focal length of a concave mirror is given by F=R/2, where R is the radius of curvature of the spherical surface. When used in an off-axis configuration the focal lengths in the tangential and sagittal planes become:

$$F_t = R \cos \varnothing / 2$$

$$F_s = R/2 \cos \varnothing$$

where ø is the angle of incidence at the mirror. Thus, the focal length becomes shorter in the plane of dispersion (tangential) and longer in the perpendicular (sagittal) plane.

The ideal image of the slit at the detector plane is a magnified replica which reproduces both the width and height of the illuminated portion of the slit. To optimize resolution the width of the slit is focused, which is normally in the tangential plane of the system. The sagittal image comes to a focus behind the detector plane if left uncompensated, with the result that the image at the detector is blurred in the vertical direction. If the detector is not sufficiently large to accept the full size of the blurred vertical image a loss of sensitivity will result. If an exit slit is used in place of a detector and the height of the exit slit is insufficient to capture the entire vertical span then the throughput is reduced.

These issues are all well-known and have typically been addressed by designing spectrometers with the smallest possible fold angles, often at the cost of increasing the size and complexity of the spectrometer design. This classical approach minimizes but does not eliminate the problem. The current invention discloses an alternative and quite general method of addressing the astigmatism problem by eliminating it entirely.

BRIEF SUMMARY OF THE INVENTION

This invention is a method for improving image quality in a spectrometer using one or more specially shaped mirrors to correct astigmatism in spectrometers.

BRIEF DESCRIPTION OF THE DRAWINGS

For a fuller understanding of the nature and objects of the invention, reference should be made to the following detailed description, taken in connection with the accompanying drawings, in which:

FIG. 3 shows compensation of astigmatism.

DESCRIPTION OF THE PREFERRED EMBODIMENT

Figure 1:
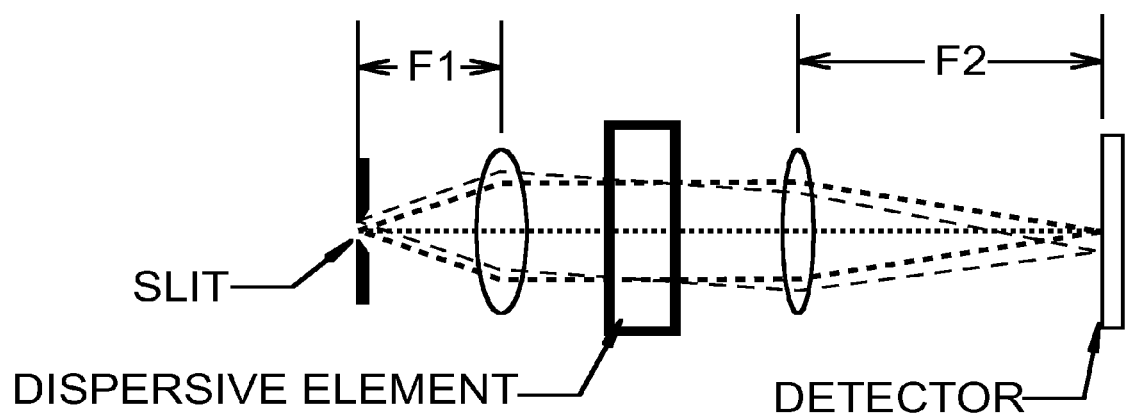
FIG. 1 shows a generalized layout of an optical system of a spectrometer.
Figure 2:
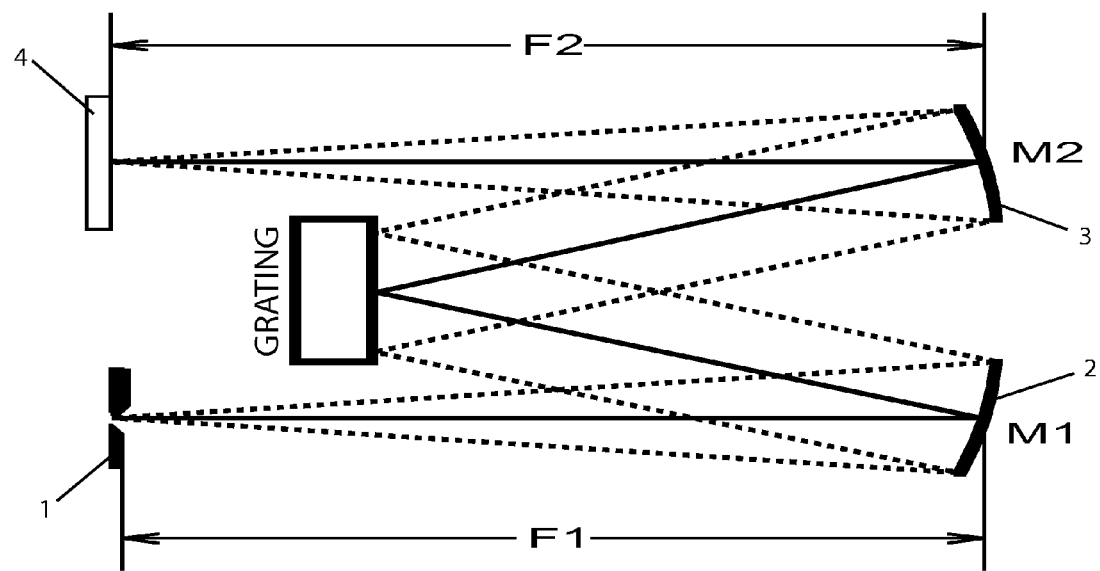
FIG. 2 shows a generalized layout of a grating spectrometer.

As shown in FIG. 2 and mentioned above the ideal image of the slit (1) at the detector (4) plane is a magnified replica which reproduces both the width and height of the illuminated portion of the slit (1). To optimize resolution the width of the slit (1) is focused, which is normally in the tangential plane of the system. The sagittal image is often uncompensated and comes to a focus behind the detector (4) plane, with the result that the image at the detector (5) is blurred in the vertical direction. If the detector (4) is not sufficiently large to accept the full size of the blurred vertical image a loss of sensitivity will result.

To avoid this loss of sensitivity it is desirable to adjust the mirrors (2 & 3) to bring the sagittal and tangential image planes into coincidence. By adjusting the curvature of the mirrors (2 & 3) in the vertical direction the focal length in the sagittal plane can be varied to compensate the astigmatism arising from any given fold angle.

One way to accomplish this is to equate the expressions for focal length given earlier to find:

$$R_S = R_T (\cos \varnothing)^2$$

where $R_S$ and $R_T$ are the radii of curvature in the sagittal and tangential directions, respectively. This ensures the effective focal lengths of the mirrors (2 & 3) are the same in both axes in spite of the fold angle, and results in an optical system where the astigmatism is cancelled at all points of the system and the overall magnification is the same as for the spherical system in the absence of the off-axis aberrations.

However, it is often desirable to limit the correction term to only one of the mirrors (2 & 3) since spherical mirrors are easier and cheaper to fabricate. There are two methods of accomplishing this as illustrated in FIG. 3.

In some cases the vertical size of the detector (4) limits the useful height of the slit (1) image. This is often the case when 1-D array detectors (4) are used. Thus, even when the vertical blur arising from astigmatism is corrected, the image height may exceed the detector (4) size and efficiency will be lost. In that case it is desirable to shrink the image height as much as possible, and this consideration dictates whether M1 (2) or M2 (3) should be used to achieve compensation.

For a two-lens imaging system the image height is proportional to the magnification, which in turn is given by the ratio of focal lengths:

$$M = F2/F1$$

Placing the astigmatism correction on M2 (3) reduces the sagittal focal length, F2, relative to F1. This in turn reduces the effective system magnification in the sagittal direction relative to that of the tangential direction. The vertical size of the image is thereby smaller, and has the effect of improving the collection efficiency of "short" detectors.

This discussion of the preferred embodiment has addressed the radii of curvature of concave mirrors (2 & 3) along the two planes which characterize the astigmatic system. It should be noted there are many mathematical functions which can form the description of a mirror surface and that can accommodate unequal radii in perpendicular planes. The selection of toroidal rather than some other shape in the case of the preferred embodiment is determined largely by fabrication issues and should not be taken to reduce the generality of the description.

For lowest cost of fabrication, the mirrors must be molded instead of individually fabricated (for example by turning or polishing). Therefore the shape of the mirror is chosen in conjunction with molding techniques. For molding of the mirrors, a suitable mold is fabricated. The preferred method of fabricating a mold for the spectrometer mirrors is diamond turning. While virtually any function can be machined with diamond turning, the preferred shape for fabrication is toroidal. An artifact of diamond turning is that residual grooves in the machined part (which are faithfully transferred to the molded parts) act as weak diffraction gratings, giving rise to background scatter and ghost images. This issue is particularly evident for visible and UV applications. In order to reduce or eliminate ghost images and randomize scatter, the molds are preferentially polished after diamond turning in order to reduce or eliminate regular grooves. The polishing operation may replace regular grooves with random grooves and therefore may not improve the actual surface roughness of the mold while improving mirror performance. Alternatively, it is also possible to program the diamond tool to cut the mold such that the regular grooves are parallel to the plane of dispersion and therefore the ghost images scattering from the mirror would be in a plane perpendicular to the dispersion and therefore not appear at a wavelength different from the wavelength of the light being scattered.

Since certain changes may be made in the above method of correcting astigmatism in spectrometers without departing from the scope of the invention herein involved, it is intended that all matter contained in the description thereof or shown in the accompanying figures shall be interpreted as illustrative and not in a limiting sense.

What is claimed is:

1. A method for shaping the mirrors resulting in astigmatism correction in a spectrometer having a folded optical path using two mirrors comprising:

first determining the angle of incidence of said folded optical path at each mirror;

next determining the square of the cosine of said determined angle of incidence at each mirror;

next multiplying said square of the cosine of said determined angle of incidence at each mirror by the radius of curvature in the tangential plane of each mirror; and, then shaping each mirror using the result of said multiplying step as the radius of curvature of the sagittal plane of each mirror.

2. A method for shaping one mirror resulting in astigmatism correction in a spectrometer having a folded optical path using two mirrors comprising: first determining the angle of incidence of said folded optical path at said one mirror;

next determining the square of the cosine of said determined angle of incidence at said one mirror;

next multiplying said square of the cosine of said determined angle of incidence at said one mirror by the radius of curvature in the tangential plane of said one mirror; and, then shaping said one mirror using the result of said multiplying step as the radius of curvature of the sagittal plane of one said mirror.

* * * * *